Jan. 31, 1967  M. EBERT  3,301,054
FLUID METER WITH SUMMATING DRIVE
Filed Feb. 19, 1964
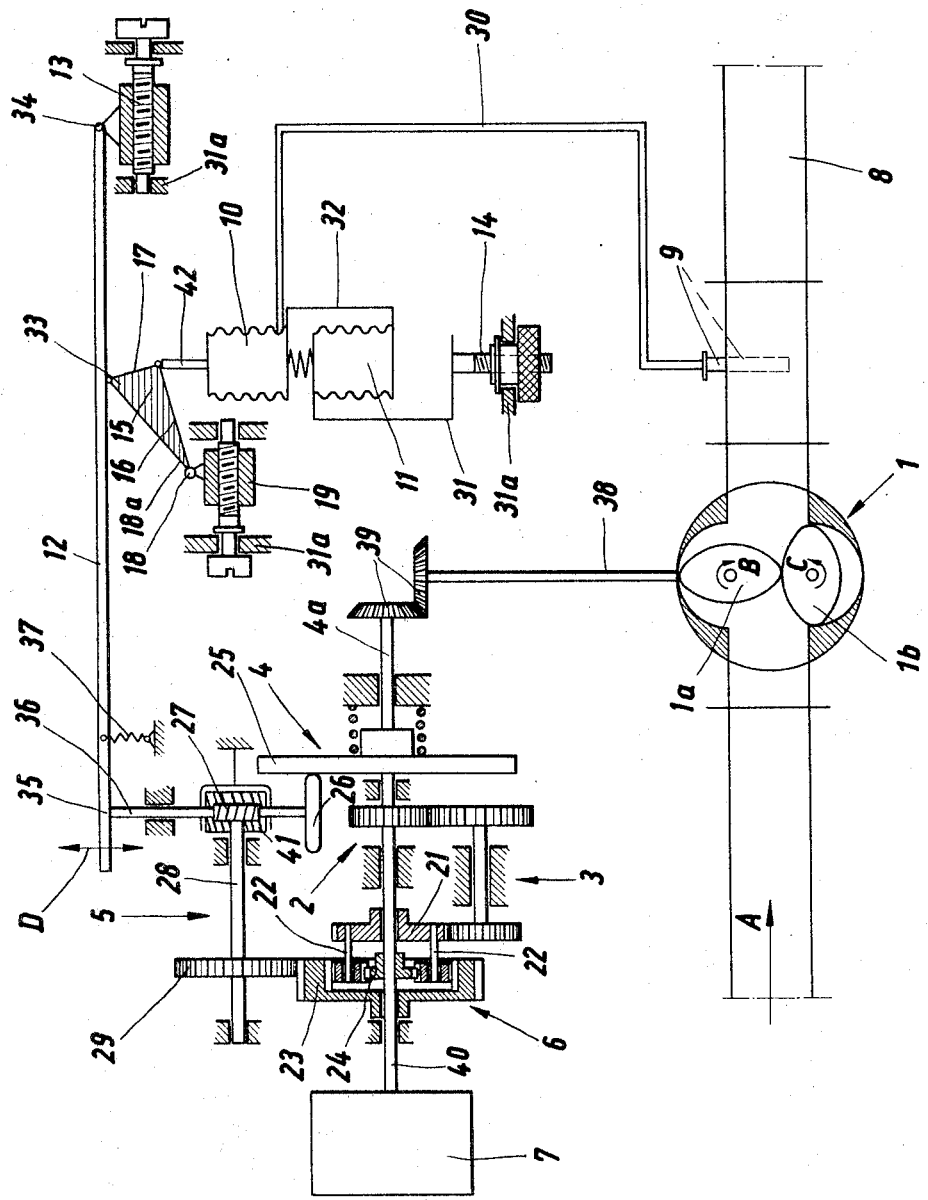
Inventor:
MARTIN EBERT
By Shoemaker and Mattare
ATTys.

United States Patent Office
3,301,054
Patented Jan. 31, 1967

3,301,054
FLUID METER WITH SUMMATING DRIVE
Martin Ebert, Mannheim-Gartenstadt, Germany, assignor to Bopp & Reuther G.m.b.H., Mannheim-Waldhof, Germany
Filed Feb. 19, 1964, Ser. No. 345,875
Claims priority, application Germany, Feb. 21, 1963, B 70,827
3 Claims. (Cl. 73—233)

The invention relates to a flow meter for fluids.

Conventional volumetric measurement of fluid media with continuously operating meters gives a throughput reading at the particular temperature of the medium being measured. Such a simplified method no longer satisfies present-day requirements. The demand for greater accuracy calls for the heat expansion of the fluid to be taken into account, so that the values measured at a given operating temperature may be corrected to a predetermined reference temperature.

For this purpose, it is known to provide compensating apparatus comprising a drive including a main branch driving the counter of the meter through fixed gearing and a secondary drive branch which varies the transmission ratio of the gearing of the main branch by means of differential gearing and adjustable transmission means such as friction wheels. This variation is effected by adjusting the friction wheels in dependence on a temperature measuring device which is generally a thermometer located in the fluid flow and operating on the expansion principle, for example with concertina bellows. If the expansion member is mounted outside the flow of fluid, a second expansion member is connected thereto to compensate for ambient temperature.

Such apparatus with differential gearing and friction wheel adjustment in the secondary drive branch executes a calculating operation according to the equation $$V_o = V_t(1 - \alpha \Delta t) \qquad (1)$$

wherein $V_o$ is the volume at a given reference temperature, $V_t$ is the volume measured at the operating temperature $t$, $\alpha$ is the coefficient of expansion of the medium being measured and $\Delta t$ is the difference between the operating temperature and the reference temperature.

However, this calculating operation by the drive is only an approximation, since the volume of the fluid really varies according to the equation $$V_t = V_o(1 + \alpha \Delta t) \qquad (2)$$

Hence, $$V_o = \frac{V_t}{1 + \alpha \Delta t} - V_t[1 - \alpha \Delta t + (\alpha \Delta t)^2 - (\alpha \Delta t)^3 + (\alpha \Delta t)^4 \ldots] \qquad (3)$$

If the higher powers of $(\alpha \Delta t)$ are omitted, one obtains the approximation $$V_o = \frac{V_t}{1 + \alpha \Delta t} = V_t(1 - \alpha \Delta t) \qquad (1)$$

As a result of this approximation, the $\alpha$ value proudced by the correcting drive becomes a function of the temperature difference $\Delta t$.

The invention aims to eliminate this basic, systematic error inherent in known apparatus, so as to provide an important improvement in the flow measurement of fluids independently of their temperature. According to the invention, the friction wheel drive is controlled by the stroke of the temperature measuring system in dependence on the temperature of the medium to be measured, a function lever being interposed. The function lever, which is interposed between a lever for operating the friction wheel drive and a thrust rod of the temperature measuring system, takes into account in a second approximation the quadratic term of the above equation (3), thus:

$$V_o = V_t[1 - \alpha \Delta t + (\alpha \Delta t)^2] \qquad (4)$$

or $$V_o = V_t[1 - \alpha \Delta t(1 - \alpha \Delta t)] = V_t(1 - \alpha' \Delta t)$$

By taking into account the quadratic term, the correction value is:

$$\alpha' \Delta t = \alpha \Delta t (1 - \alpha \Delta t) \qquad (5)$$

The function lever converts the linear stroke of the temperature measuring system into a stroke $y$ approximately corresponding to the equation:

$$y = x - h(1 - \cos \varphi)$$

in which the rotation of the function lever by the stroke $x$ of the temperature measuring system is designated $\varphi$. Moreover:

$$1 - \cos \varphi = 2 \sin^2 \frac{\varphi}{2}$$

and if the angle of rotation $\varphi$ is small the sine may be replaced by the angle of rotation.

With the approximation:

$$\varphi \approx \frac{x}{c}$$

it follows, finally, that:

$$y = x\left(1 - \frac{h}{2c^2}x\right) \qquad (6)$$

where $c$ and $h$ are the short sides of a right-angled triangle. This equation makes it possible to obtain equation (5) in the form:

$$E' \Delta t = E \Delta t \left(1 - \frac{h}{2c^2} E \Delta t\right)$$

The requisite dimensions for the function lever may be obtained by corresponding comparison with the coefficient.

It may easily be proved by exact calculation that the value of $\alpha$ resulting from the approximation of equation (1) is dependent on the temperature difference $\Delta t$, whereas the value of $\alpha$ as corrected by the function lever remains constant for the temperature ranges occurring in practice.

Thus the possible applications of this temperature-compensating apparatus are greatly improved and extend beyond all known systems, even over wide ranges of $\Delta t$.

An example of the invention is illustrated diagrammatically in the accompanying drawing.

The fluid medium to be measured flows through a conduit 8 in the direction of the arrow A and, during its flow, traverses a volumetric metering device 1 which is preferably a positive displacement meter having movable dividing walls. In the illustrated version, the device 1 comprises co-operating oval rotary pistons or gears 1a and 1b which are rotated in the directions indicated by the arrows B and C, respectively. Located downstream of the device 1 in the conduit 8, there is the senser 9 of a temperature measuring system referred to hereinafter.

The rotation of the pistons 1a, 1b is transmitted in any suitable manner known to those skilled in the art to a friction wheel drive generally indicated at 4, the intention being to drive an indicating or reading mechanism or counter 7 of the fluid meter. For example, the oval pistons 1a, 1b may drive a transmission shaft 38 carrying a bevel gear 39 which co-operates with a like bevel gear 39 mounted on the shaft 4a which also carries a fricion disc 25 of the drive 4. At this stage, the rotary driving movement initially imparted to the pistons by the fluid being measured is forked into two branches.

By means of a main drive branch 3 comprising the gears generally indicated at 2, rotation is imparted to an integrator 6 in the form of differential or epicyclic gearing. More particularly, the main branch 3 drives the planet carrier 21 which causes the planet gears 22 to planetate within the internally and externally toothed ring gear 23 and to rotate the sun gear 24 on the input shaft 40 to the counter 7.

The aforementioned friction disc 25 drives a friction wheel 26 which is located on a shaft 36 and is operatively connected to the worm 27 of a secondary drive branch 5 for the counter 7. The shaft 36 is reciprocable in the direction of the arrows D. The worm 27 engages a worm wheel 41 seated on a shaft 28 carrying a gear 29. The gear 29 is in engagement with the outside of the ring gear 23. At the location of the ring gear 23, therefore, the main and secondary drive branches 3 and 5, respectively, are reunited and the respective rotary movements are summated by the epicyclic gearing 6 and transmitted to the counter 7.

It will be evident that the rotary speed of the friction wheel 26 is dependent on its position relatively to the rotary axis of the friction disc 25 and that such position therefore governs the additional rotary movement imparted to the outside of the ring gear 23 to influence the input to the counter 7. The position of the friction wheel 26 is controlled by deflecting means in the form of operating bellows 10 forming part of the aforementioned temperature measuring system that also comprises the temperature senser 9 projecting into the conduit 8. The senser 9 contains as expansion fluid which expands or contracts under the influence of the temperature of the fluid medium flowing in the conduit 8 and transmits such expansion or contraction through capillary tubing 30 to the operating bellows 10.

The operating bellows 10 are counterconnected by a link 32 to one end of compensating means in the form of bellows 11 which compensate for ambient temperature. The other end of the bellows 11 is joined by a link 31 and adjusting means 14 to the stationary frame 31a which may be the housing of the entire device. Since both bellows tend to deflect under the influence of ambient temperature variations but one end of the bellows 11 is fixed so that all its deflection is transmitted in the opposite direction to the operating bellows 10, the effect of ambient temperature fluctuations is balanced out and deflections executed by the bellows 10 will be a true indication of temperature variations from a predetermined reference value of the fluid medium inside the conduit 8. The aforementioned adjusting means 14 comprise a set screw which, when turned, serves to displace the link 31 so as to set the predetermined reference temperature. At such setting, a push rod 42 at the free end of the bellows 10 will have assumed a predetermined position in relation to a transmission lever or function member 15 which effects the mathematical correction hereinbefore described.

Variations from the reference temperature as detected by the senser 9 are thus transmitted as deflections to the reciprocable push rod 42 which, in turn, swivels the transmission member 15 in the form of a right-angled triangle having the two shorter sides 16 and 17 and a hypotenuse 18a. At the junction 18 of the side 16 and hypotenuse 18a the member 15 is pivoted to the frame 31a but adjusting means 19 comprising a set screw are provided to permit the actual pivot point 18 to be varied in a direction transverse to the reciprocating path of the push rod 42.

As already explained, deflections of the free end of the operating bellows 10 and hence the displacement, say $x$, of the push rod 42 will be proportional to the temperature variation of the fluid medium being measured. By virtue of rotation of the transmission member or function lever 15, such displacement $x$ is converted to a displacement $y$ of the junction 33 between the side 17 and hypotenuse 18a of the right-angled triangle in accordance with the equation (6) as hereinbefore derived. The linear displacement constant of the push rod 42 is thereby converted according to the non-linear function having the equations (4) and (5) above.

The junction point 33 is pivoted to a lever 12 which, in turn, is pivoted to the frame 31a at 34 and bears on the aforementioned shaft 36 of the friction wheel 26 at 35. The lever ratio, i.e. the ratio of the spacing between the points 34 and 33 to the spacing between the points 34 and 35 can be varied by adjusting means 13 comprising a set screw. For a given displacement of the push rod 42 and transmission member 15, such adjustment by the means 13 can cause the wheel 26 to be displaced to a greater or smaller extent in accordance with a predetermined heat coefficient or a predetermined density of the medium being measured. The deflection of the friction wheel 26 influences the secondary branch drive 5 as already explained so that the reading at the counter 7 takes into account the expansion or contraction of the fluid medium being measured. A tension spring 37 ensures that the lever 12 will always be in operative engagement with the shaft 36 of the friction wheel 26.

I claim:

1. A fluid meter comprising, in combination, a recording mechanism; a rotatable volumetric metering device; and a summating drive between said metering device and said recording mechanism and comprising a main drive branch including differential gears and a secondary drive branch including friction wheel means, said friction wheel means including a first friction wheel having an axis and being connected to said metering device to be rotated about said axis, said first friction wheel having a side face, and a second friction wheel having an axis substantially normal to said axis of said first friction wheel and engaging said side face of the latter to be driven thereby, and means for adjusting said secondary drive branch comprising expandable bellows means in operative engagement with the fluid to be metered and connecting means including a first lever pivotally mounted at one end thereof and operatively engaging in the region of the other end thereof said second friction wheel, and a triangular function lever pivotally mounted at one corner thereof and engaging at a second corner thereof said bellows means and at the third corner thereof said first lever intermediate the ends of the latter.

2. A fluid meter as set forth in claim 1, and including means for adjusting the position of said one end of said first lever relative to said function lever.

3. A fluid meter as set forth in claim 1, and including means for adjusting the position of said pivotal corner of said triangular lever substantially in direction of said first lever.

References Cited by the Examiner

UNITED STATES PATENTS

| 2,208,687 | 7/1940 | Renfrew | 73—233 |
| 2,791,118 | 5/1957 | Holtz | 73—233 |
| 3,000,211 | 9/1961 | Thuse et al. | 73—233 |
| 3,020,758 | 2/1962 | Granberg et al. | 73—233 X |
| 3,053,082 | 9/1962 | Loud et al. | 73—233 |

FOREIGN PATENTS

| 627,982 | 3/1936 | Germany. |
| 746,484 | 4/1936 | Germany. |

RICHARD C. QUEISSER, *Primary Examiner.*

EDWARD D. GILHOOLY, *Assistant Examiner.*